United States Patent
Greenbaum et al.

[11] 3,897,457
[45] July 29, 1975

[54] HALOGEN CONTAINING TRICYCLIC COMPOUNDS

[75] Inventors: Sheldon B. Greenbaum, Livingston; Edward D. Weil, Yonkers; Jack S. Newcomer, Wilson, all of N.Y.

[73] Assignee: Hooker Chemicals & Plastics Corporation, Niagara Falls, N.Y.

[22] Filed: Aug. 15, 1972

[21] Appl. No.: 280,921

Related U.S. Application Data

[60] Division of Ser. No. 787,245, Dec. 26, 1968, Pat. No. 3,687,831, which is a continuation-in-part of Ser. No. 589,811, Oct. 27, 1966, abandoned, which is a continuation-in-part of Ser. No. 16,965, March 23, 1960, abandoned.

[52] U.S. Cl.......... 260/340.3; 260/2.5 FP; 117/136; 106/15 FP
[51] Int. Cl................................. C07d 15/00
[58] Field of Search.................. 260/340.3

[56] References Cited
UNITED STATES PATENTS
2,974,147  3/1961  Marschall et al. ............... 260/340.3

OTHER PUBLICATIONS
Wagner et al., Synthetic Organic Chemistry, New York, John Wiley & Sons, 1953 pages 261–263 relied on.

*Primary Examiner*—Donald G. Daus
*Assistant Examiner*—Anne Marie Tighe
*Attorney, Agent, or Firm*—Peter F. Casella; James F. Mudd

[57] ABSTRACT

Compounds having excellant insecticidal properties and utility as fire retardants have the formula:

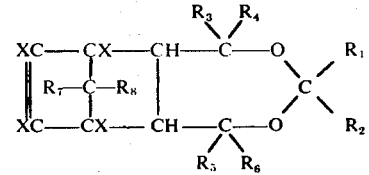

wherein X is halogen, the R substituents can be hydrogen, hydrocarbon or substituted hydrocarbon radicals, and the $R_7$ and $R_8$ can additionally be halogen. Halogenation products of the foregoing compounds are especially useful.

2 Claims, No Drawings

HALOGEN CONTAINING TRICYCLIC COMPOUNDS

REFERENCE TO PRIOR APPLICATIONS

This is a division of copending application Ser. No. 787,245, filed Dec. 26, 1968, now U.S. Pat. No. (3,687,831); which was filed as a continuation-in-part of application Ser. NO. 589,811, filed Oct. 27, 1966, now abandoned, which was filed as a continuation-in-part of application Ser. No. 16,965, filed Mar. 23, 1960, now abandoned.

The invention relates to new halogen containing tricyclic compounds. More specifically, the invention relates to novel tricyclododecenes, derivatives thereof, and processes for preparing same.

The compositions of the invention have the following structural formula:

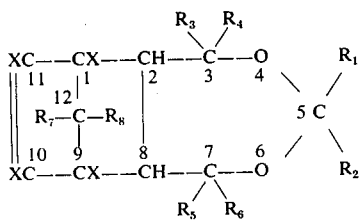

wherein X is halogen and wherein $R_1$ and $R_2$ can be hydrogen, alkyl, substituted alkyl, alkoxyalkyl, cycloalkyl, alkenyl, substituted alkenyl, aryl, substituted aryl, aralkyl, alkaryl, mixtures thereof, and wherein $R_1$ and $R_2$ taken together can form a cycloalkyl ring, and wherein $R_1$ and $R_2$ taken together can form a heterocyclic ring, and wherein $R_3$, $R_4$, $R_5$ and $R_6$ can be hydrogen, alkyl, substituted alkyl, alkoxyalkyl, cycloalkyl, alkenyl, substituted alkenyl, aryl, substituted aryl, aralkyl, alkaryl, and mixtures thereof, and wherein $R_7$ and $R_8$ can be halogen, hydrogen, alkoxy, alkylmercapto, and mixtures thereof, The halogen in the above compounds can be chlorine, fluorine, bromine or iodine. The above compounds can be named as follows, wherein for convenience the substituents X, $R_7$ and $R_8$ are taken as chlorine, and the substituents $R_1$, $R_2$, $R_3$, $R_4$, $R_5$ and $R_6$ are each hydrogen: 1,9,10,11,12,12-hexachloro-4,6-dioxa($7.2.1.0^{2,8}$)-10-tricyclododecene, hereinafter referred to by the abbreviated form HDT. Where any of the R substituents are other than as in HDT, for example, where $R_1$ is phenyl, the compounds may be named as follows: 1,9,10,11,12,12-hexachloro-4,6-dioxa-5-phenyl-($7.2.1.0^{2,8}$)-10-tricyclododecene, in which case the abbreviated form will also be used, for example, 5-phenyl-HDT. The compounds have been named in accordance with the Baeyer plan of nomenclature ("The Ring Index, Ring Systems Used in Organic Chemistry" by Patterson and Capell, Reinhold Pub. Co. 1940, pgs. 24 and 26). Thus the numbers in the parentheses indicate the number of members in the right, left and middle bridges of the tricyclic structure and the superscripts indicate the ends of the fourth bridge.

The compositions of the present invention can be conveniently prepared by the reaction between a halogen containing bicyclic diol and an aldehyde or ketone, in accordance with the following equation, wherein X, $R_1$, $R_2$, $R_3$, $R_4$, $R_5$, $R_6$, $R_7$ and $R_8$ are as defined above:

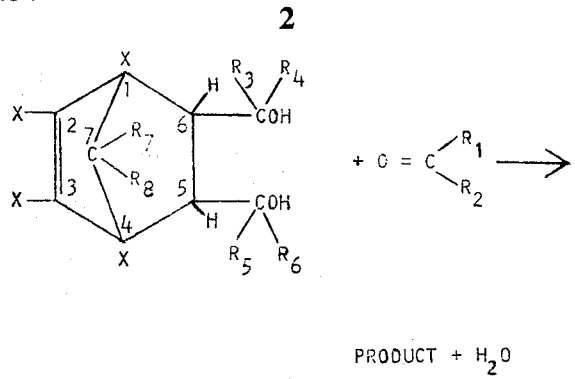

It was unexpected and surprising to find that the sevenmembered ring would form by reacting the above bicyclic diol with the above aldehydes or ketones. This is especially true in view of the difficulty in obtaining a seven-membered ring by cyclization and also in view of the possibility of polymer formation. Still further, since the above bicyclic diol is easily converted to the five-membered ether by heating in the presence of a trace of acid, it is especially surprising and unexpected to find that the less stable seven-membered ring would form in the presence of acid.

In the above reaction the bicyclic diol is preferably reacted with the aldehyde or ketone in the presence of from about 0.001 to one percent by weight based on the weight of the diol of a strong, non-volatile acid catalyst such as for example, p-toluenesulfonic acid, trichloroacetic acid, phosphoric acid, ferric chloride, and concentrated sulfuric acid. The water produced by the reaction may be removed by any method known in the art such as azeotropic or simple distillation. The reaction temperatures may vary between about 35° and 300° centigrade. The time of reaction will vary based on reactants employed, degree of completion of the reaction desired and reaction temperature. It is, of course, realized that when a lower boiling aldehyde or ketone is employed, the reaction may be run under pressure in order to attain appropriate reaction temperatures. A solvent is preferred but not necessary to the present invention. The solvent should be inert with respect to reactants and reaction products and should have a boiling point suitable for reaction at elevated temperatures. Monochlorobenzene has been found to be an excellent solvent for the reaction. Other suitable solvents include toluene, xylene, benzene, methylene chloride, chloroform, carbon tetrachloride, etc. Small amounts of lower boiling but less powerful solvents (i.e., a less powerful solvent has less dissolving power) may be added to more powerful but higher boiling solvents to lower the temperature at which the water is removed. Typical of such solvents is low boiling petroleum ether. The reactants are preferably reacted together in equimolar proportions; however, an excess of either reactant may be conveniently employed without adverse results.

The halogen containing bicyclic diol is known in the art and may be simply prepared by the Diels-Alder adduction of the appropriate halogen-containing cyclopentadiene as the diene and cis-2-butene-1,4-diol as the dienophile. Alternatively, the appropriate halogen-containing cyclopentadiene may be reacted with an ester of an unsaturated dialcohol, with subsequent transformation of the Diels-Alder adduct into the free alcohol. Typical halogencontaining bicyclic diols which may be employed include, but are not limited by the following:

5,6-Bis(hydroxymethyl)-1,2,3,4,7,7-hexachlorobicyclo-(2.2.1)-2heptene;
5,6-Bis(hydroxymethyl)-1,4,5,6,7,7-hexabromobicyclo-(2.2.1)-2-heptene;
5,6-Bis(hydroxymethyl)-1,4,5,6-tetrachloro-7,7-difluorobicyclo-(2.2.1)-2-heptene;
5,6-Bis(hydroxymethyl)-1,4,5,6-tetrachlorobicyclo-(2.2.1)-2-heptene;
5,6-Bis(hydroxymethyl)-1,4,5,6,7,7-hexa fluorobicyclo-(2.2.1)-2-heptene;
5,6-Bis(1-hydroxyethyl)-1,2,3,4,7,7-hexachlorobicyclo-(2.2.1)-2-heptene;
5,6,-Bis(hydroxymethyl)-1,2,3,4-tetrachloro-7,7-dimethoxybicyclo-(2.2.1)-ps 2-heptene; and the like.

Typical aldehydes or ketones which may be employed are those having the following structural formula:

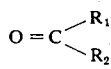

wherein $R_1$ and $R_2$ are as defined above. Typical substituents include the following: hydrogen, methyl, ethyl, butyl, hexyl, nonyl, dodecyl, octadecyl, chloromethyl, chloroethyl, chlorobutyl, methoxymethyl, ethoxymethyl, methoxyethyl, methoxynonyl, propenyl, chloropropenyl, butenyl, vinyl, allyl, phenyl, naphthyl, anthracyl, salicyl, chlorophenyl, chloronaphthyl, nitrophenyl, benzyl, xylyl, phenylethyl, propylphenyl, octylphenyl, cyclohexyl, cyclopentyl, cyclobutyl, furfuryl, nicotinyl, thienylmethyl, and the like, wherein the cyclic radicals can be $R_1$ and/or $R_2$ taken alone, or $R_1$ and $R_2$ taken together to form a cycloalkyl or heterocyclic ring. Specific aldehydes and ketones which can be employed include formaldehyde, acetaldehyde, diethylacetaldehyde, methoxyacetaldehyde, chloral, α-chloroacetaldehyde, dichloroacetaldehyde, propionaldehyde, butyraldehyde, valeraldehyde, caproic aldehyde, glycolic aldehyde, lactic aldehyde, α-chlorobutyraldehyde, butyrchloral, crotonaldehyde, cinnamaldehyde, chlorocrotonaldehyde, benzaldehyde, ortho-, meta- and parachlorobenzaldehyde, ortho- and para-anis-aldehyde, phenyl acetaldehyde, 2,4-dihydroxybenzaldehyde, 2,4-dinitrobenzaldehyde, salicylaldehyde, chlorosalicylaldehyde, o-ethyoxybenzaldehyde, α-naphthoic aldehyde, para-methylbenzaldehyde, thienylacetophenone, acetone, α, α,dichloroacetone, bromoacetone, dihydroxyacetone, isonitroacetone, methyl ethyl ketone, dibutyl ketone, diamyl ketone, methyl hexyl ketone, dibenzyl ketone, acetophenone, valerophenone, benzophenone, benzal acetone, dibenzal acetone, acetophenone dibromide, p-bromoacetophenone, o-hydroxyacetophenone, methoxyacetophenone, cyclopentanone, cyclohexanone, diphenyl propiophenone, bromoaceto-β-naphthone, 2,4'-dichlorobenzophenone, p-methoxybenzophenone, 2,4-dihydroxybenzophenone, 3,3'-dinitrobenzalacetone, w-nitroacetophenone, nitrobenzalacetophenone, furfuralacetophenone, nicotinylacetophenone.

Alternatively, the compositions of the invention may be prepared by the Diels-Alder adduction of a halogenated cyclopentadiene as the diene and a dioxepene as the dienophile. The reaction may be shown as follows, wherein X, $R_1$, $R_2$, $R_3$, $R_4$, $R_5$, $R_6$, $R_7$ and $R_8$ are defined as above:

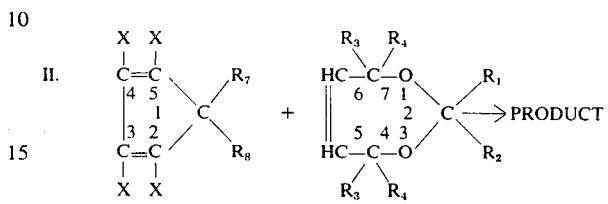

It is preferred but not necessary to conduct the reaction in the presence of a solvent which is inert with respect to the reactants and reaction products under the conditions of the reaction. Chlorobenzene has been found to be an excellent solvent; however, others which may be used include the following: dioxane; epichlorohydrin; monochlorobenzene; dichlorobenzene; n-butanol; toluene; xylene; benzene; butyl cellosolve; methyl cellosolve; methyl isobutyl ketone; diethyl carbitol; t-butyl alcohol; benzyl alcohol; n-amyl alcohol; t-amyl alcohol; acetonitrile; isobutyronitrile; and the like. The reaction is preferably conducted at reflux, but the temperature may vary between about 50 and 200 degrees centigrade. The reaction product may then be separated from solution by procedures known to the art. For example, crystallization from ethanol, with recrystallization if desired.

The dioxepene starting materials are known in the art and may be conveniently prepared in accordance with Pattison, Journal of Organic Chemistry, 22, 662 (1957). Generally speaking, the dioxepenes may be prepared by reacting together a 1,4-diol unsaturated in the two position (such as cis-2-butene-1,4-diol) with an aldehyde or ketone in the presence of a strong, non-volatile acid catalyst.

Typical halogenated cyclopentadienes include the following illustrative compounds: hexachlorocyclopentadiene; hexafluorocyclopentadiene; hexabromocyclopentadiene; 1,1-dibromo-2,3,4,5-tetrachlorocyclopentadiene; 1,1-difluoro-2,3,4,5-tetrachlorocyclopentadiene; 1,1-dimethoxy-2,3,4,5,-tetrachlorocyclopentadiene; 1,1-dibutoxy-2,3,4,5-tetrachlorocyclopentadiene; 1,1-dimethylmercapto-2,3,4,5-tetrachlorocyclopentadiene; and the like.

Typical dioxepenes include the following illustrative compounds: 1,3-dioxep-5-ene; 1,3-dioxep-2-methyl-5-ene; 1,3-dioxep-2-ethyl-5-ene; 1,3-dioxep-2-propyl-5-ene; 1,3-dioxep-2-butyl-5-ene; 1,3-dioxep-2-octyl-5-ene; 1,3-dioxep-2-nonyl-5-ene; 1,3-dioxep-2dodecyl-5-ene; 1,3-dioxep-2-phenyl-5-ene; 1,3-dioxep-2-(p-chlorophenyl)5-ene; 1,3-dioxep-2-(2,4-dichlorophenyl)-5-ene; 1,3-dioxep-2-(2,4,5trichlorophenyl)-5-ene; 1,3-dioxep-2-(p-nitrophenyl)-5-ene; 1,3-dioxep2-naphthyl-5-ene; 1,3-dioxep-2-anthracyl-5-ene; 1,3-dioxep-4-methyl5-ene; 1,3-dioxep-7-ethyl-5-ene; 1,3-dioxep-4-phenyl-5-ene; 1,3-dioxep4,7-diphenyl-5-ene; 1,3-dioxep-2-methyl-4-ethyl-5-ene; and the like.

The compounds of the present invention are useful as flame retarding agents for plastic materials such as polystyrene, polyesters, and polyurethane foams. A significant advantage of the dioxatricyclododecene structure is its solubility in organic compounds, for example, HDT is considerably more soluble in toluene or in styrene than the corresponding diol of Equation I, or than the closely related cyclic ether prepared by removal of one mole of water from the diol of Equation I. The compounds of the present invention are also useful per se as pesticides. Still further, the compounds of the present invention are useful as intermediates in the preparation of pesticidal materials, for example, the halogenation products of the present invention are highly active pesticides. These chlorination compounds are prepared by the use of chlorinating agents such as elementary chlorine or sulfuryl chloride in the presence of an inert solvent such as carbon tetrachloride at temperatures between about 35° and 100° centigrade and in the presence of ultraviolet radiation. A typical example is shown in Example 12. The compounds of the present invention are also useful as intermediates in the preparation of a wide variety of compounds. The compounds of the present invention are also useful as fungicides and herbicides. Still further, some of the compounds of the present invention are useful as monomers and in copolymerization reactions. The resultant polymeric materials are flame retardant due to the high halogen content.

Typical compounds prepared in accordance with the present invention include the following: HDT; spiro-5-cyclobutane-HDT; spiro -5-cyclohexane-HDT; spiro-5-cyclopentane-HDT; spiro-5-cycloheptane-HDT; 5-(3-propenyl)-HDT;5-(3-butenyl)-HDT; 5-(1-chloro-3-propenyl)-HDT; 5-methyl-HDT; 5-trichloromethyl 5-ethyl-HDT; 5-propyl-HDT; 5-butyl-HDT; 5-hexyl-HDT; 5-nonyl-HDT; 5-dodecyl-HDT; 5-dimethyl-HDT; 5-diethyl-HDT; 5-methyl-5-octyl-HDT; 5-methyl-5-(3-propenyl)-HDT; 5-methoxymethyl; 5-phenyl-HDT; 5-phenyl-5-methyl-HDT; 5-phenyl-5-ethyl-HDT; 5-dichloromethyl-HDT; 5-(4-chlorophenyl)-HDT; 5-(2,4-dichlorophenyl)-HDT; 5-(2,4,5-trichlorophenyl)-HDT; 5-(4-nitrophenyl)-HDT; 5-(4-methoxymethyl)-HDT; 5-benzyl-HDT; 5-tolyl-HDT; 3-methyl-HDT; 3,7-dimethyl-HDT; 3,5,7-trimethyl-HDT; 3-ethyl-HDT; 3-methoxymethyl-HDT; 3-cyclohexyl-HDT; 3-cyclopentyl-HDT; 3-propenyl-HDT; 3-($\alpha$-chloropropenyl)-HDT; 3-tolyl-HDT; 7-phenyl-HDT; 3,7-diphenyl-HDT; 7-(4-nitrophenyl)-HDT; 3-benzyl-HDT; 3,5-dibenzyl-HDT; 3-xylyl-HDT; 12-dihydro-HDT; 12-dimethoxy-HDT; 12-diethoxy-HDT; 12-dimethylmercapto-HDT; 12 -diethylmercapto-HDT; 12-dibutylmercapto-HDT; 3-methyl-5-propyl-HDT; 3-methoxymethyl-5-ethyl-HDT; 3-propenyl-5-dimethyl-HDT; 5-dimethyl-12-dihydro-HDT; 5-propyl-12-dimethyoxy-HDT; 5-cyclohexyl-12-dimethoxy-HDT and the like.

The following examples further illustrate the invention, but are not intended to limit it. All parts are by weight and temperatures are in degrees centigrade, unless indicated otherwise.

EXAMPLE 1 - PREPARATION OF HDT

A mixture of 99.5 grams of hexachlorocyclopentadiene, 40 grams of 1,3-dioxep-5-ene and 100 milliliters of chlorobenzene were heated under reflux with stirring for sixteen hours. Upon removal of the solvent under reduced pressure, the mass crystallized and was further purified by recrystallization from ethanol and treatment with charcoal. The yield was 46 grams of white crystals melting at 104° to 107° centigrade.

Analysis: Calculated for $C_{10}H_8O_2Cl_6$ : Cl, 57.05 percent

Found: Cl, 56.5 percent

EXAMPLE 2 - PREPARATION OF HDT 61.3 Grams of 5,6-bis(hydroxymethyl)-1,2,3,4,7,7-hexachlorobicyclo-(2.2.1)-2-heptene, referred to commercially and hereinafter as chlorendic diol, 5 grams paraformaldehyde, 0.03 gram of p-toluenesulfonic acid and 180 milliliters of chlorobenzene were mixed and heated in a flask equipped with a Dean-Stark trap for separating the co-distilled water from the chlorobenzene. After five hours of heating, the solution was allowed to cool overnight. The slight precipitate of unreacted HET diol was removed and the supernatant liquid was freed of chlorobenzene under reduced pressure. The residue crystallized from ethanol and affords 35 grams of HDT melting at 106° centigrade.

EXAMPLE 3 - PREPARATION OF SPIRO-5-CYCLOHEXANE-HDT 61.3 Grams of chlorendic diol, 17.1 grams of cyclohexanone, 0.03 grams of p-toluene sulfonic acid, 180 milliliters of chlorobenzene and 25 milliliters of toluene were heated under reflux for 5 hours in a flask equipped with a Dean-Stark trap for liquids lighter than water. The trap was initially filled with toluene. The solvents were then removed under vacuum and the residue recrystallized from dilute ethanol.

After removal of a small amount of oil, the remainder crystallized to give 42 grams of spiro-5-cyclohexane-HDT melting at 60° to 62° centigrade.

Analysis: Calculated for $C_{15}H_{16}Cl_6O_2$ : Cl, 48.2 percent

Found: Cl, 48.2 percent

EXAMPLE 4 - PREPARATION OF 5-PHENYL-HDT

5-Phenyl-HDT was prepared in the manner of Example 3, using 28.2 grams of benzaldehyde instead of cyclohexanone. This product apparently exists as two isomers. Recrystallization of the crude from hexane affords 16 grams of one isomer, melting point 130°–136° centigrade (137–139 after several recrystallizations). Evaporation of the filtrate and recrystallization of the residue gives another isomer melting at 98° to 103° centigrade.

Analysis: Calculated for $C_{16}H_{12}O_2Cl_6$ : Cl, 47.14 percent

Found: Cl, 47.4 percent

EXAMPLE 5 - PREPARATION OF 5-(3-PROPENYL)-HDT 5-(3-Propenyl)-HDT was prepared in the manner of Example 3, except that petroleum ether (boiling point 35°–55° centigrade) was substituted for toluene and 12 grams of crotonaldehyde was substituted for the cyclohexanone. A small amount of hydroquinone was added before distillation of the solvent. The two recrystallizations from methanol gave 17 grams of 5-(3-propenyl)-HDT melting at 126°–127° centigrade.

Analysis: Calculated for $C_{13}H_{12}O_2Cl_6$ : Cl, 51.5 percent

Bromine number: 38.9

Found: Cl, 51.1 percent

Bromine number: 37.2

EXAMPLE 6 - PREPARATION OF 5-TRICHLOROMETHYL-HDT

45 Grams chlorendic diol, 19 grams of chloral, and 25 milliliters concentrated sulfuric acid were heated at 70° centigrade for 2 hours. It should be noted that in the case of chloral the sulfuric acid is used as a catalyst and solvent. The mixture was then cooled and extracted with 100 milliliters of carbon tetrachloride. The carbon tetrachloride solution was washed with ice water, sodium bicarbonate solution and dried over magnesium sulfate. Removal of the solvent and recrystallization of the residue from ethanol, hexane, and the ethanol again gave a crystalline substance melting at 168°–172° centigrade. After careful drying in vacuo infrared analysis demonstrated the absence of OH groups.

Analysis: Calculated for $C_{11}H_7O_2Cl_9$ : Cl, 65.1 percent
Found: Cl, 64.2 percent

EXAMPLE 7 - PREPARATION OF 5-(4-CHLOROPHENYL)-HDT 5-(4-Chlorophenyl)-HDT was prepared in the manner of Example 3, using 24 grams p-chlorobenzaldehyde. The yield of solid product melting at 106°–110° centigrade was 95 grams.

Analysis: Calculated for $C_{16}H_{11}O_2Cl_7$ : Cl, 51.3 percent
Found: Cl, 50.6 percent

EXAMPLE 8 - PREPARATION OF 5-(2,4-DICHLOROPHENYL)-HDT 5-(2,4-Dichlorophenyl)-HDT was prepared in the manner of Example 3, using 30 grams 2,4-dichlorobenzaldehyde. The yield of product melting at 125°–133° centigrade was 61 grams.

EXAMPLE 9 - PREPARATION OF 5-(2,4,5-TRICHLOROPHENYL)-HDT 5-(2,4,5-Trichlorophenyl)-HDT was prepared in the manner of Example 3, using 35 grams 2,4,5-trichlorobenzaldehyde. The yield was 20 grams of solid melting at 165°–167° centigrade.

Analysis: Calculated for $C_{16}H_9O_2Cl_9$ : Cl, 57.7 percent
Found: Cl, 56.8 percent

EXAMPLE 10 - PREPARATION OF 5-(4-NITROPHENYL)-HDT 5-(4-Nitrophenyl)-HDT was prepared in the manner of Example 3, using 36.1 grams chlorendic diol and 15.5 grams p-nitrobenzaldehyde. The yield was 28 grams of solid, melting at 192°–194° centigrade.

Analysis: Calculated for $C_{16}H_{11}Cl_6NO_4$ : N, 2.8 percent
Found: N, 2.8 percent

EXAMPLE 11 - PREPARATION OF 5-($\alpha,\beta$-Dichloropropyl)-HDT 5-($\alpha,\beta$-Dichloropropyl)-HDT was prepared as follows: 61.3 grams of the compound 5,6-bis(hydroxymethyl)-1,2,3,4,7,7-hexachlorobicyclo-(2.2.1)-2-heptene were reacted with 12 grams of crotonaldehyde in the presence of 0.03 gram of paratoluene sulfonic acid, 180 milliliters of chlorobenzene and 50 milliliters of petroleum ether. The reactants were heated and stirred under reflux for 5 hours, and the evolved water was collected. The reaction mixture was permitted to cool and the resulting precipitate was filtered off. The supernatant liquid was reduced to dryness under vacuum and the residue was recrystallized from ethanol twice to provide an intermediate product. 20.6 grams of this intermediate product were redissolved in 210 milliliters of carbon tetrachloride and the solution was cooled with ice. To the cold solution was added 100 milliliters of cold carbon tetrachloride containing 3.6 grams of dissolved chlorine, over a period of two hours. The resulting reaction mixture was evaporated to dryness under reduced pressure to recover the 5-($\alpha,\beta$-dichloropropyl)-HDT.

The following example shows the typical procedure for halogenating the compounds of the invention.

EXAMPLE 12 - HALOGENATION OF 5-PHENYL-HDT

A solution of 22.5 grams (0.05 mole) of 5-phenyl-HDT in 150 milliliters of carbon tetrachloride was heated to between about 65°–70° centigrade and treated with elementary chlorine in the presence of ultraviolet radiation until a total of 0.2 mole of hydrogen chloride was evolved. The amount of hydrogen chloride evolved was determined by titration with standard base. The solvent was removed under reduced pressure to afford a thick, yellow liquid.

Analysis: Calculated for $C_{16}H_8O_2Cl_{10}$ : Cl, 60.4 percent
Found: Cl, 60.4 percent The following examples show the chlorination of the compounds of the invention. In every case the compounds were chlorinated in the manner of Example 12, with the moles of chlorine reacted as indicated.

| Example | Compound | Moles of Chlorine Reacted |
|---|---|---|
| 13 | 5-Phenyl-HDT | 3 |
| 14 | Spiro-5-cyclohexane-HDT | 2 |
| 15 | 5-(4-Chlorophenyl)-HDT | 2 |
| 16 | 5-(4-Chlorophenyl)-HDT | 4 |
| 17 | 5-(2,4-Dichlorophenyl)-HDT | 2 |
| 18 | 5-(2,4-Dichlorophenyl)HDT | 4 |
| 19 | 5-(2,4,5-Trichlorophenyl)-HDT | 2 |
| 20 | 5-(2,4,5-Trichlorophenyl)-HDT | 4 |

In addition, one mole of chlorine was added to the 5-(3-propenyl)-HDT without the evolution of HCl.

The following examples show the pesticidal use of the compounds of the invention. The procedure utilized was a one gram sample of the compound to be tested dissolved in 0.5 milliliter of benzene or dimethyl formamide and 0.5 milliliter Triton X-100 added. Triton X-100 is a wetting agent chemically being an alkylaryl polyether alcohol. The mixture was then brought to 100 milliliters with distilled water.

The compound of Example 28 was formulated in an aqueous composition comprising one gram of sample, 0.5 milliliter of acetone and 0.5 milliliter of Tritron X-100 wetting agent per 100 milliliters of water.

| Example | Compound | Moles Cl$_2$ Reacted | Concentration Required for 100% Kill | |
|---|---|---|---|---|
| | | | Housefly | Southern Army Worm(Larva) |
| 21 | HDT | 0 | 1% | — |
| 22 | HDT | 2 | 0.1% | — |
| 23 | HDT | 4 | 0.05% | 0.05% |
| 24 | 5-Phenyl-HDT | 2 | — | 0.075% |
| 25 | 5-Phenyl-HDT | 4 | 0.05% | 0.05% |
| 26 | 5-(4-Chloro-phenyl)-HDT | 0 | — | 0.1% |
| 27 | 5-(2,4,5-Tri-chlorophenyl)-HDT | 0 | — | 0.1% |
| 28 | 5-($\alpha,\beta$-Dichloro-propyl)-HDT | 0 | — | 0.1% |

These compounds are ordinarily applied as toxicants for combatting pests in conjunction with a carrier which may be a solid, liquid or gaseous material, the inventive compounds constituting the essential active toxic ingredients of such compositions. For this purpose, the compounds of the invention can be employed either in the form of aqueous sprays or dust compositions, and the amount of toxicant used may vary, a sufficient quantity being utilized to provide the desired toxicity, that is, the compound is used in a pesticidally effective proportion.

When employed in the form of a powder or dust for killing insects and mites, the above compounds or toxicants may be mixed with a substantial proportion of any suitable inert material or diluent, preferably in finely divided form, such as known grades of prepared parasiticide carrier clays, pyrophyllite, fuller's earth, bentonite, sulfur, lime, talc, whiting, diatomaceous earth, and the like. Suitable dusts of this type usually contain not less than one percent by weight of toxicant.

Liquid insecticide or miticide sprays containing the toxicants of the invention may be prepared by first forming a solution of the compound in a suitable organic solvent, e.g., xylene, methylated naphthalenes or any highly aromatic petroleum-type insecticide oil, and preferably adding a small amount of wetting or emulsifying agent commonly employed in the art, such as diglycol oleate or p-isooctylphenyl ether of polyethylene glycol. The resulting concentrate solution is incorporated with water in quantity sufficient to form an aqueous spray dispersion or emulsion having the desired active ingredient concentration to facilitate use of the compound in an insecticidally or miticidally effective proportion, as the case may be. Effective insecticidal concentrations are generally in the range from about 0.01 to 20 pounds per acre.

In a preferred embodiment, aqueous spray dispersions or emulsions may be formed by incorporating in water dry mixtures or so-called wettable spray powders containing the compounds of the invention. These mixtures may also include inert diluents, suitable quantities of wetting or emulsifying agents and, if desired, secondary toxicants.

The aqueous spray dispersions of the invention preferably should contain the active ingredient in an amount not less than one-sixty-fourth of a pound per 100 gallons of spray, the more usual concentrations being in the range of one-sixteenths to several pounds per 100 gallons of spray.

EXAMPLE 29 - USE AS A FLAME-PROOFING AGENT

A mixture of 9 grams of styrene, five grams of HDT and 0.1 gram of benzoyl peroxide was heated in a test tube at 80° centigrade for 16 hours. The casting thus obtained was self-extinguishing with regard to the flame produced by holding the casting in the flame of a bunsen burner. Removal from the bunsen burner causes extinguishment of the flame.

Alternatively, novel but less preferred compounds may be prepared in accordance with the present invention wherein X is selected from the group consisting of hydrogen, halogen, alkyl, and mixtures thereof. These compounds may be simply prepared, for example, from cyclopentadiene or optionally alkylated cyclopentadienes.

In the foregoing specification, the disclosed alkyl radicals, including substituted radicals, generally contain from 1 to about 18 carbon atoms, and preferably from 1 to about 6 carbon atoms; the alkenyl radicals, including substituted radicals, generally contain from 2 to about 18 carbon atoms and preferably from 2 to about 6 carbon atoms. The aryl radicals are hydrocarbon aryl groups or substituted hydrocarbon aryl groups, which generally contain from 6 to about 14 carbon atoms, and preferably from 6 to about 10 carbon atoms. The aralkyl and alkaryl groups generally contain from 7 to about 14 carbon atoms, preferably from 7 to about 10 carbon atoms. The cycloalkyl and heterocyclic groups generally contain 3 to about 12 carbon atoms, preferably 4 to about 7 carbon atoms.

This invention may be embodied in other forms or carried out in other ways without departing from the spirit or essential characteristics thereof. The embodiments set forth herein are therefore to be considered illustrative and nor restrictive.

We claim:

1. A compound having the formula

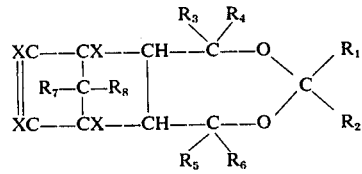

wherein X is halogen, R$_1$ and R$_2$ taken together form a cycloalkyl group of 4 to 7 carbon atoms; R$_3$, R$_4$, R$_5$ and R$_6$ are independently selected from the group consisting of hydrogen, alkyl of 1 to 6 carbon atoms, alkoxyalkyl of 2 to 12 carbon atoms, cycloalkyl of 4 to 7 carbon atoms, alkenyl of 2 to 6 carbon atoms, monochloroalkenyl of 2 to 6 carbon atoms, phenyl, mononitrophenyl, benzyl, tolyl, and xylyl; and R$_7$ and R$_8$ are selected from the group consisting of hydrogen, halogen, alkoxy of 1 to 6 carbon atoms.

2. Spiro-1,9,10,11,12,12-hexachloro-4,6-dioxa-5-cyclohexane-(7.2.1.0$^{2,8}$)-10-tricyclododecene.

* * * * *